United States Patent
Tse

(10) Patent No.: US 7,778,173 B2
(45) Date of Patent: Aug. 17, 2010

(54) CLOCK RECOVERY ALGORITHM FOR REMULTIPLEXING MPEG-2 SPTSS AND/OR MPTSS IN THE PRESENCE OF NETWORK JITTER

(75) Inventor: Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1276 days.

(21) Appl. No.: 11/029,972

(22) Filed: Jan. 4, 2005

(65) Prior Publication Data

US 2006/0146815 A1  Jul. 6, 2006

(51) Int. Cl.
*H04J 1/16* (2006.01)
*H04L 12/26* (2006.01)

(52) U.S. Cl. .................................................. 370/230.1
(58) Field of Classification Search ................... 370/516
See application file for complete search history.

(56) References Cited

U.S. PATENT DOCUMENTS

| | | | | |
|---|---|---|---|---|
| 4,718,074 A * | 1/1988 | Mannas et al. | ............... | 375/371 |
| 5,640,388 A * | 6/1997 | Woodhead et al. | ........... | 370/468 |
| 5,936,968 A * | 8/1999 | Lyons | .......................... | 370/503 |
| 6,195,392 B1 * | 2/2001 | O'Grady | ................ | 375/240.28 |
| 6,351,508 B1 * | 2/2002 | Shishkoff et al. | ............ | 375/375 |
| 6,356,567 B2 * | 3/2002 | Anderson et al. | ............ | 370/516 |
| 6,522,204 B1 * | 2/2003 | Rennick | ........................ | 331/1 A |
| 6,639,952 B1 * | 10/2003 | Meyer | .......................... | 375/327 |
| 6,650,719 B1 * | 11/2003 | Baker | .......................... | 375/371 |
| 6,703,877 B2 * | 3/2004 | Kobayashi et al. | ........... | 327/156 |
| 6,831,892 B2 * | 12/2004 | Robinett et al. | .............. | 370/232 |
| 6,901,209 B1 * | 5/2005 | Cooper et al. | ................ | 386/109 |
| 7,058,837 B2 * | 6/2006 | Elko et al. | .................... | 713/375 |
| 2002/0015423 A1 * | 2/2002 | Rakib et al. | .................. | 370/485 |
| 2004/0064504 A1 * | 4/2004 | Domschitz | ................... | 709/203 |
| 2004/0131136 A1 * | 7/2004 | Fast et al. | ..................... | 375/376 |
| 2004/0258188 A1 * | 12/2004 | Kim et al. | ..................... | 375/376 |
| 2005/0238061 A1 | 10/2005 | Woodward | | |
| 2007/0201500 A1 | 8/2007 | Deshpande | | |

FOREIGN PATENT DOCUMENTS

| | | |
|---|---|---|
| WO | 2005/076634 A1 | 8/2005 |
| WO | 2005/107268 A1 | 11/2005 |

OTHER PUBLICATIONS

ISO/IEC 13818-1 Standard, Information technology—Generic coding of moving pictures and associated audio information: Systems, ISO/IEC Reference No. ISO/IEC 13818-1:2000(E), pp. I-154, 2000.

* cited by examiner

*Primary Examiner*—Raj Jain
(74) *Attorney, Agent, or Firm*—Patterson & Sheridan, LLP

(57) ABSTRACT

A method and apparatus for clock recovery for constant bit rate MPEG-2 compliant single program transport stream and multiple program transport stream delivered over UDP/IP is disclosed. Clock recovery utilizes a dejittering filter to remove arrival time jitter from received packets and a phase lock loop is used to recover a PCR clock rate up to a range allowed by the MPEG-2 System specification. An MPEG-2 compliant output stream is produced, even when the input PCR does not meet the timing requirement specified by the MPEG-2 System specification.

19 Claims, 3 Drawing Sheets

CLOCK RECOVERY ALGORITHM FOR REMULTIPLEXING MPEG-2 SPTSS AND/OR MPTSS IN THE PRESENCE OF NETWORK JITTER

BACKGROUND OF THE INVENTION

The Moving Picture Experts Group (MPEG) is an ISO-promulgated group of standards. MPEG-2, the standard on which such products as digital television set top boxes and DVD are based, is a video encoding format that has become the standard for VoD service over cable video networks. The ISO's MPEG-2 Systems specification, incorporated herein by reference in its entirety, is designed for a network with constant end-to-end delay. MPEG-2 has a stringent timing requirement in the packet schedule and time stamps. It works well for some dedicated video networks such as ASI or IF/RF used in existing hybrid fiber coax (HFC) plants.

Recently, cable operators have adopted IP over Gigabit Ethernet (IP/GbE) technology for video distribution networks. IP/GbE offers many advantages over other transport technologies, such as lower cost, simplified network management, and flexibility for introducing new services. However, IP networks have an inherent problem of network jitter that violates the MPEG assumption on the underlying delivery mechanism. This problem needs to be solved before cable networks can deliver seamless video to subscribers.

While IP/GbE is used to distribute MPEG video from the headend to the distributed hub, the existing HFC plant is still used as the "last mile" delivery medium to subscribers. At the distribution hub, the video data first is IP depacketized, then remuxed, modulated and upconverted for transmission on the HFC network to the subscriber's set top box. During this transition, network jitter introduced by the IP has to be removed. In addition, due to the remixing process, in which multiple input, single program transport stream (SPTS) streams are multiplexing (referred to herein as muxing) together into a single output stream, the incoming packets need to be rescheduled. According to MPEG, any clock references need to be adjusted for the schedule change. In order to do this, the gateway needs to recover the source clock. Thus, there remains a need for an efficient method and apparatus for removing network jitter from the IP network and recovering the clock in the source.

A multiple program transport stream (MPTS) is an MPEG-2 compliant transport stream that contains multiple programs. MPTS is the bitstream format used by subscriber television providers to deliver multiple programs to end users on the subscriber network. A subscriber network utilizing cable diffusion to set-top devices located at subscriber locations, typically includes a headend system from which the transport streams originate, and distribution hub systems located between the headend system and individual subscribers.

The programs contained in the MPTS may have different time bases. The bundling of multiple programs into MPTS can be performed either at the headend of the network or at the distribution hubs. For on-demand content, such as video on demand (VoD), remultiplexing (referred to herein as remuxing) is typically performed at the distribution hubs. For digital broadcast television channels, the multiplexing is normally performed at the headend. MPTS allows the use of statistically remuxing, which yields better overall video quality at a lower total bitrate. If digital television broadcast content is delivered to the distribution hub gateway using MPTS, the gateway needs to be able to handle remuxing of MPTS input with other single program transport streams (SPTS) for on-demand content delivery.

SUMMARY OF THE INVENTION

The present invention provides a clock recovery method and apparatus that can handle SPTS having constant bitrates. An embodiment of the present invention can be used for MPTS pass-through, where an entire output quadrature amplitude modulation (QAM) is used for a single MPTS input stream. It can also be used for MPTS remuxing, where an MPTS can be multiplexed with other SPTS or MPTS streams.

Implementations of the present invention utilize a dejittering filter followed by a phase lock loop to remove arrival time jitter and recover PCR clock rates and produces an MPEG-2 compliant output stream. An embodiment of the present invention can also handle MPTS as a single super program. One of the PCR PIDs is selected as a master PCR PID. PCRs carried on the PCR PIDs are called master PCRs. The phase lock loop is used to track the clock frequency of the master PCR clock. PCRs in PIDs other than the master PCR PID are referred to herein as slave PCR, and their PIDs slave PCR PIDs. Slave PCRs are treated as non-PCR PIDs, with additional special treatment to provide the time base offset for PCR correction. Since the input MPTS has a constant bitrate, the same dejittering filter can be used to remove arrival time jitter. In the following description, we will use the term PCR to refer to only master PCRs in the case of MPTS.

The dejittering filter is applied to all incoming MPEG packets. In an embodiment, the dejittering filter is implemented as a simple infinite impulse response (IIR) filter that takes advantage of the constant bitrate nature of MPEG-2 streams to reduce IP packetization and network jitter in the arrival time. This greatly improves the convergence rate of the phase lock loop. MPEG packets containing PCR are fed to the phase lock loop together with their corresponding dejittered arrival times. The time base offset between the PCR and the dejittered arrival time is computed and compared with the estimated time base offset from the integrator in the phase lock loop.

In an embodiment, the phase lock loop is also implemented as an IIR filter that produces the time-averaged time base error. This is then converted into a clock frequency difference by a loop gain multiplier. Before the frequency difference is fed to the integrator, it is clamped to make sure that the output clock frequency and clock slew rate is complaint with the MPEG-2 Systems Specification. Due to clamping, the output clock only tracks the source PCR within the range specified by the MPEG-2 Systems Specification. If the source PCR clock rate is beyond this accuracy range, the output PCR remains MPEG-2 compliant. In this case a drift between source and output PCR may accumulate, and cause internal buffer underflow or overflow. Output time base adjustment will be triggered if a buffer problem occurs. The integrator is used to generate an estimated time base offset that is used for correcting the next PCR. In an embodiment, the integrator serves as the digital equivalent of a VCO in a normal phase lock loop.

Besides calculating a time base offset, the delivery time is also provided for every output video packet. This is accomplished by increasing the delivery time by the output packet interval for each input video packet. The output packet interval is adjusted on each (master) PCR packet. Its value is calculated by dividing the output PCR increment of the number of input packets between the current and the previous (master) PCRs.

Clock recovery in accordance with the present invention involves monitoring the source for signal interruption and PCR jumps. If a noncompliant PCR jump is detected from the input, the PCR is handled to reduce visual artifacts on the output packet stream. (A non-compliant PCR jump is a disrupt change of PCR value without signaling it by the discontinuity_indicator field in the adaptation field as specified in MPEG-2 standard.) In a embodiment, the discontinuity_indicator will be set at the output to make it MPEG-2 compliant.

The present invention can also handle packets without PCRs. In this case, only the dejittering filter is applied. The packets are output according to a smoothed schedule.

Many other features and advantages of the present invention will be apparent upon reading the following detailed description when considered in conjunction with the accompanying drawings, in which:

DETAILED DESCRIPTION

Figure 1:
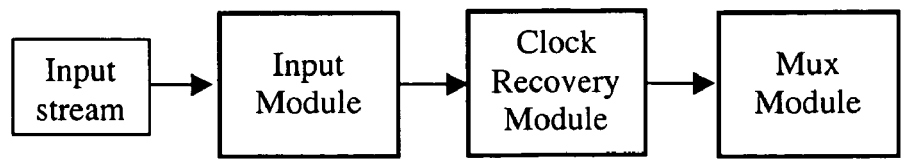
FIG. 1 illustrates in high-level block diagram form the major functional components of the present invention.

Directing attention to FIG. 1, the present invention provides a video on demand line card for communication router switches. The line card receives input from a Gigabit Ethernet port on the switch's backplane. In an embodiment, the input consists of multiple MPEG-2 streams over UDP over IP. Each input stream can be a constant bit rate (CBR) SPTS or MPTS. The MPEG streams are dejittered and remultiplexed into MPEG-2 MPTS. The MPTS are scrambled if necessary, QAM modulated and up-converted into a QAM signal that is delivered over QAM outputs. In an embodiment, the present invention supports additional features such as MPEG over RTP over UDP over IP. In an embodiment, the line card of the present invention receives IP-encapsulated MPEG transport streams from an IP network, multiplexes and delivers them to an HFC network through QAM interfaces. The output MPEG stream has to satisfy the buffering and timing requirements set by the MPEG-2 standard. The present invention provides a clock recovery module that provides information to the multiplexer and the output FPGA so that MPEG-compliant output streams can be generated.

Because the line card of the present invention does not maintain an elementary stream buffer model, it is important that the output packet schedule be as close as possible to the original packet timing according to the sender to avoid buffer violation. This means that the multiplexer needs to schedule a transport packet (TP) based on the original send time of the packet from the sender. Since the multiplexer operates based on the local time base, a mapping from the source time base to the local time base is necessary. It is the responsibility of the clock recovery module to establish this mapping, which takes into account the phase and frequency differences between the two clocks. This process is referred to herein as source clock tracking.

To perform source clock tracking, an arrival timestamp is obtained by sampling the local clock when the packet arrivals. If the packet contains a source timestamp, it can then be compared with the arrival timestamp to establish the time base mapping. The source timestamp can be the program clock reference (PCR), or the RTP timestamp in case of RTP session. Since the input packet is received through an IP network, network jitter will contaminate the arrival timestamp. Thus, a dejittering technique is employed before source clock tracking can be performed.

For a TP carrying a (master) PCR, the time base mapping can be used to find out the delivery time of this TP. For other TPs, delivery time can be obtained based on the piece-wise constant bit rate assumption of the input bit stream according to the MPEG standard. The multiplexer can then used the delivery time provided by clock recovery to schedule the TP.

Since in general there will be minor adjustment of the output timing of a TP, the PCR value of a PCR-carrying TP needs to be updated to reflect the true send out time as required by the MPEG-2 standard. This process is referred to herein as PCR correction. In the case of MPTS, PCR correction is needed for master and slave PCRs. In the present invention, PCR correction is performed by the output FPGA using the time base offset information provided by the clock recovery module.

In an embodiment, clock recovery is performed right after input packet information is extracted. Clock recovery is implemented using a phase lock loop. A dejittering buffer is implemented between the input/clock recovery and the multiplexing modules to absorb input network jitter. The size of the dejittering buffer is determined by the maximum input network jitter supported. This maximum jitter is configurable on a per-program basis.

In summary, there are four major functions of the clock recovery module: de-jittering, source clock tracking, PCR adjustment, and delivery time calculation. The source clock tracking and PCR adjustment are performed on every PCR-carrying MPEG packet, while dejittering and delivery time calculation are performed on all MPEG packets.

The MPEG-2 Systems specification states that a compliant MPEG-2 transport stream needs to satisfy the following timing requirements: the system clock is 27 MHz with tolerance of ±810 Hz, or 30 part per million (ppm), the system clock has a rate of change with time less than 0.075 Hz per second, and the PCR has a low tolerance of ±500 nanosecond (ns). In addition, the elementary stream buffer should not be overflowed or underflowed in normal play mode. The clock recovery module makes sure that the output MPEG streams are compliant in normal operation once it reaches steady state.

In an embodiment, the present invention accommodates input jitter up to 100 milliseconds (peak to peak). The user can configure the maximum jitter on a per-program basis through a command line interface. The clock recovery module accommodates the configured maximum network jitter for each channel. The present invention is useful in VoD applications, where low system delay is important. The decision on delivery time calculation methods (extrapolation versus interpolation) can have some impact on the system delay. A convergence rate refers to how soon clock recovery can lock the source clock. Buffer violation may occur before a stable time base mapping is established, so the convergence rate needs to be increased to an acceptable period.

The clock recovery module of the present invention supports a variety of input formats, including CBR SPTS and MPTS over UDP over IP. Due to the nature of CBR, delivery time calculation can be performed in place (extrapolated, for example) when a TP is received. System delay can also be minimized, which is an important criterion for VoD application.

In an embodiment, the clock recovery module takes advantage of RTP timestamps to improve convergence rate. The major differences between RTP timestamps and MPEG PCRs include: PCRs are in 27 MHz resolution, while RTP timestamps are in 90 kHz; for VOD applications, RTP timestamp occurrence is typically much higher than that of PCR. In general, there is one RTP timestamp for every seven TPs, while there can be one PCR every 100 milliseconds (ms) according to MPEG standards.

Figure 2:
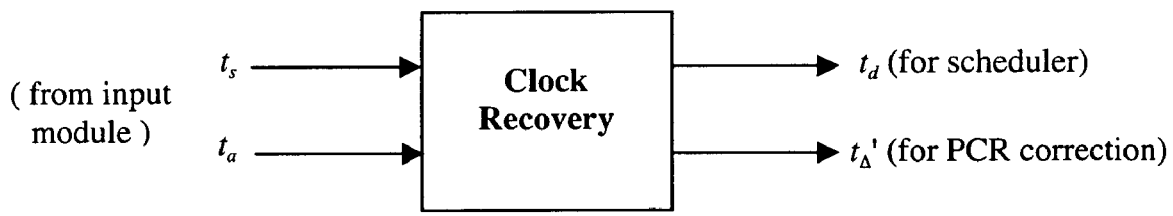
FIG. 2 illustrates in high-level block diagram form the input/output interface of the clock recovery module.

To explain the functional structures described herein, the following notations are used herein are defined as follows:

$t_s$: source timestamp, this is the PCR in the bit stream
$\Delta t_s$: interval between two adjacent source timestamps
$t_a$: arrival timestamp, indicating the local clock's value when the TP arrives to the line card
$\Delta t_a$: interval between two adjacent TP's arrival timestamps
$t_a'$: dejittered arrival time
$t_\Delta$: time base offset between the source and local time bases (measured as the difference between source timestamp and the dejittered arrival time)
e: estimation error in time base offset
$e_f$: filtered time base offset estimation error
$f_d$: estimated frequency difference between the source clock and local clock
$f_d'$: regulated frequency difference (after clamping)
$t_\Delta'$: estimated time base offset
$t_d$: target delivery time
$t_d'$: actual delivery time
$t_s'$: corrected PCR value at output
n: index for all TPs in the session
m: index for all PCR TPs in the session
$n_m$: TP index of the m-th PCR TP
$\Delta t_d$: estimated TP interval of the MPEG stream
D: system delay
R: bit rate FIG. 2 illustrates in high-level block diagram for the input/output interface of the clock recovery module. The clock recovery module sits between the input module and the scheduler/mux module. For each incoming MPEG packet, the input module provides its arrival timestamp ($t_a$), which is the local clock's value when the TP is received. For PCR (master and slave) packets, the input module also parses the header and provides the PCR value (source timestamp $t_s$). The clock recovery module computes the delivery time ($t_d$) for each outgoing TP. For PCR packet, the clock recovery module also provides an estimated time base offset ($t_\Delta'$) for the output FPGA to perform PCR correction.

One of the main goals of the clock recovery module is to deliver the incoming TPs at a constant packet rate that matches the input packet rate. The input bit rate can be computed using pairs of adjacent PCR values from the bit stream as follows: bit rate=number of bits between two adjacent PCRs/PCR value increment×($27×10^6$) bits per second.

The TPs can then be delivered according to the calculated bit rate. Although both the video server and the line card of the present invention have an internal 27 MHz clock, their clock rates are not identical at all times. Any mismatch over time will have a cumulative effect that causes internal buffer overflow or underflow.

In order to recover the source clock rate, the time difference between the (master) PCR and the arrival timestamps is determined through comparison. The PCRs represent samples from the source time base. The arrival timestamps represent samples from the local time base. Their difference is referred to herein as the time base offset, which should be a slowly varying function of time. Samples of the time base offset are fed into a digital phase lock loop. The output of the phase lock loop is a frequency difference that is used to adjust the local clock in order to match the source clock frequency.

The IP network introduces IP packetization and network jitter that corrupts arrival timestamps. This greatly affects the performance and convergence rate of the phase lock loop. For example, assuming two PCRs are apart by the maximum interval allowed by MPEG, 100 ms, and assuming that the clocks are off by maximum allowed value (30 ppm in an embodiment), then the drift in time base offset is 81 clock ticks per second. Assuming 100 ms of network jitter, the noise introduced in the arrival timestamp is 2,700,000 ticks. The phase lock loop detects the drift signal over the jitter noise, with a very small S/N ratio of 1/3333 (−45 dB). Fortunately, the signal can be improved if drift accumulates over time, while the jitter noise remains the same. A 15 minute period is useful for the signal to be comparable with the noise level. Typically, it takes a long time to track the source clock frequency. With the CBR input stream, dejittering can be performed to improve the arrival time accuracy. This greatly reduces the convergence time of the phase lock loop.

Figure 3:
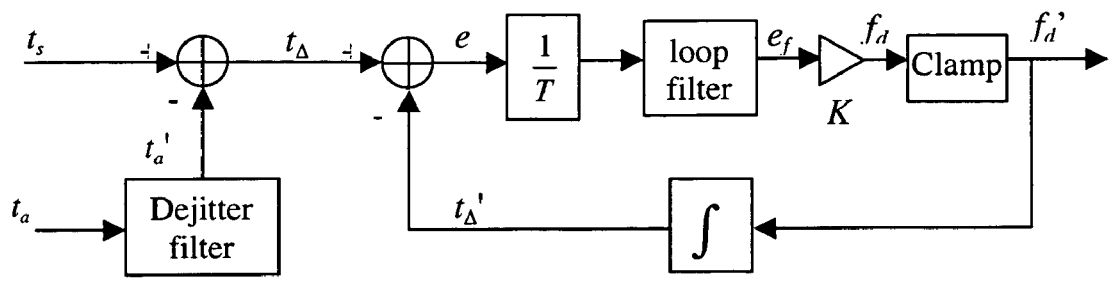
FIG. 3 illustrates in block diagram form acts performed in an embodiment of the clock recovery method of the present invention.

FIG. 3 illustrates in block diagram form acts performed in an embodiment of the clock recovery module of the present invention. The clock recovery module keeps a state on each input session. When a session starts, clock recovery transitions through a series of states until the output time base is locked. The clock recovery module then operates in a steady state mode for this session. One important factor that affects tracking time is the clock slew rate (for example, how fast the output clock can be changed to match with the source's clock). MPEG-2 allows a maximum slew rate of 0.075 Hz/s. This means it will take about six minutes for each ppm change (1 ppm is 27 Hz). For example, for 30 ppm, it makes about three hours.

Although the output clock may not track the source clock for long period of time, the output timing is still MPEG-2 compliant, as long as appropriate PCR correction is performed. A problem caused by this long tracking time is the accumulated phase difference, which results in internal buffer underflow or overflow.

Assuming an initial clock frequency difference of $\Delta f$, and a maximum output clock slew rate of s, then the time required to track the clock is $\Delta f/s$, and the accumulated drift is $(\Delta f)^2/(2s)$. Table 1 shows some examples for track time and accumulated drift where the slew rate is 0.075 Hz/sec:

TABLE 1

| Initial clock frequency difference (ppm) | Time to track | Accumulated drift (ms) |
|---|---|---|
| 1 | 6 min. | 0.18 |
| 5 | 30 min. | 4.5 |
| 10 | 1 hr. | 18 |
| 30 | 3 hr. | 162 |

Figure 4:
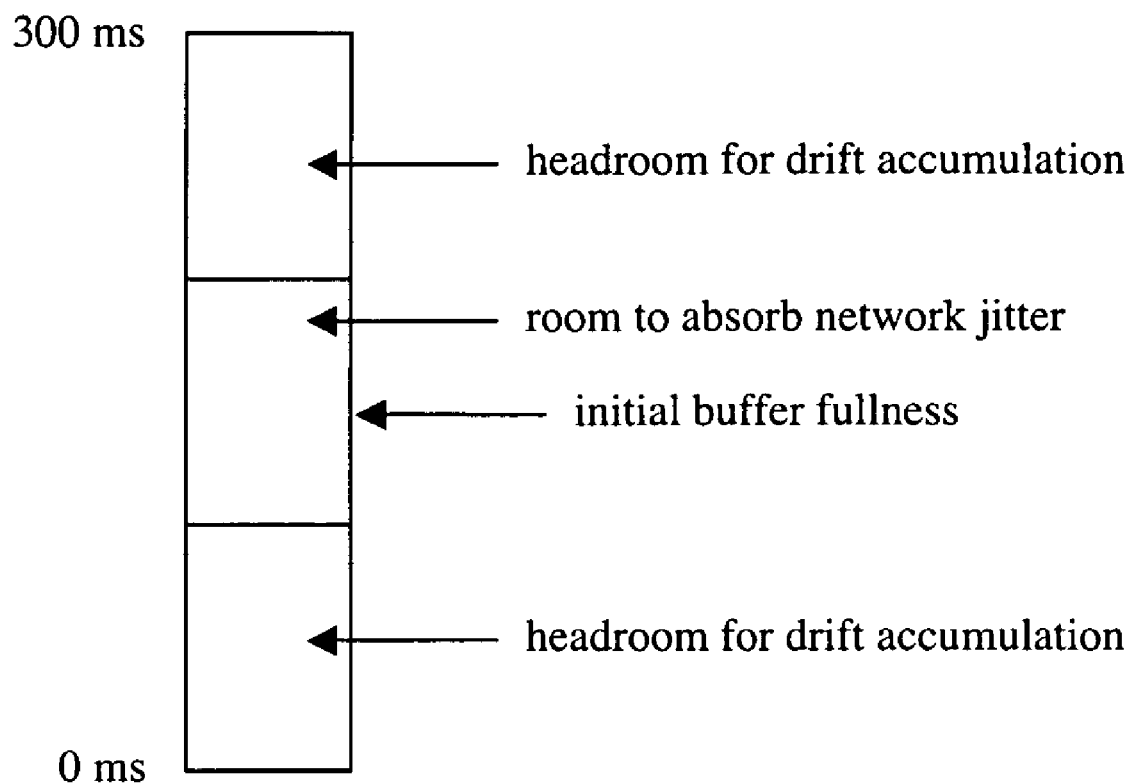
FIG. 4 illustrates in block diagram form the channel buffer and its usage.

FIG. 4 illustrates in block diagram form the channel buffer and its usage. To avoid or reduce local buffer underflow or overflow, the internal channel buffer absorbs both network jitter and drift in most cases. An internal buffer of about 300 ms is provided in an embodiment of the present invention.

Dejittering

The first step of clock recovery is to perform dejittering on the arrival time of MPEG packets. The present invention takes advantage of the CBR nature of the input stream. In an embodiment, a simple two-tap IIR filter is used to smooth out the inter-packet arrival interval:

$$\Delta t_a(n) = t_a(n) - t_a(n-1)$$

$$\Delta t'_a(n) = \alpha \Delta t_a(n) + (1-\alpha)\Delta t'_a(n-1)$$
$$= \Delta t'_a(n-1) + \alpha(\Delta t_a(n) - \Delta t'_a(n-1))$$

$$t'_a(n) = t'_a(n-1) + \Delta t'_a(n)$$

where $\alpha$ is the filter coefficient close to 0. In an embodiment, $\alpha$ is set to 0.0004.

Figure 5:
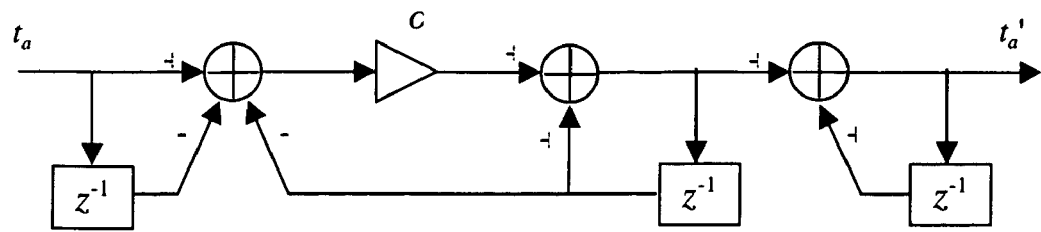
FIG. 5 illustrates in functional block diagram form the dejittering filter.

The dejittering filter (illustrated functionally in FIG. 5) converges very fast because it is applied on every input MPEG packet, including NULL packets. This is important because without the NULL packet, the CBR assumption of the input will not hold. Simulation shows that a relatively stable dejittered arrival time can be obtained typically in less than a second after the input stream starts.

Source Clock Tracking

The next act is only performed for packets containing (master) PCRs. The time base offset between the source clock and the local clock is obtained. First, the difference between the source timestamp and the dejittered arrival time is computed:

$$t_\Delta(n) = t_s(n) - t_a'(n)$$

The local timestamp is read from a hardware register by the input module. This local timestamp has the same format of PCR as described in the MPEG-2 Systems Specification: a 33-bit base part in 90 kHz and a 9-bit extension part in 27 MHz.

The offset $t_\Delta$ is then compared with the estimation $t_\Delta'$:

$$e(n) = t_\Delta(n) - t_{66}'(n)$$

The estimation $t_\Delta'$ is provided by the integrator, which can be computed according to previous information as follows:

$$\Delta t_s(n) = t_s(n) - t_s(n-1)$$

$$t_\Delta'(n) = t_\Delta'(n-1) + f_d(n-1) \times \Delta t_s(n)$$

$\Delta t_s$ is the (master) PCR interval, i.e., the elapsed time (according to the sender) between this and the previous timestamps. It is multiplied with the previous frequency difference estimation in order to update the offset estimation.

Note that $t_\Delta(n)$ computed here will be used for PCR adjustment for (master) PCR TPs as described below.

Next, the estimation error e is normalized by the PCR interval $\Delta t_s$. The normalization removes the impact of PCR interval fluctuation to the phase lock loop. The normalized error is then fed to a low pass filter to mainly suppress the network jitter component:

$$e_f(n) = LPF(e(n)/\Delta t_s(n))$$

In an embodiment, the following simple 2-tap IIR filter is used:

$$e_f(n) = (1-\beta)e_f(n-1) + \beta e(n)/\Delta t_s(n)$$

where $\beta$ can be tuned to control the bandwidth of the LPF. In general, the value of $\beta$ is close to 0. The filtered error $e_f$ should mainly represent the frequency difference. It is fed to a multiplier, which converts the error into frequency:

$$f_d(n) = K \times e_f(n)$$

The result $f_d$ here is the estimated frequency difference between the two clocks. The gain of the multiplier, K, should be selected appropriately. A large value will reduce convergence time, but also introduce instability in the loop.

Output Clock Frequency and Slew Clamping

The estimated frequency difference $f_d$ is further clamped so that it meets the MPEG-2 requirement. The MPEG-2 Standard specifies PCR frequency inaccuracy to be 30 ppm, or 810 Hz.

The PCR slew rate can be estimated using two adjacent estimated frequency difference values. If it exceeds the allowed slew rate, $f_d$ needs to be modified. The slew rate allowed by MPEG-2 (0.0075 Hz/s) would cause a long tracking time. Relaxing the slew rate to a larger value speeds up the convergence time, thus reducing the change of buffer underflow or overflow due to drift accumulation. In general, the higher slew rate will not cause visible artifacts from the decoder.

Delivery Time Calculation

The packet interval of underlying MPEG bit stream can be estimated as:

$$\Delta t_d = [t_s(n) - t_s(n-1)]/[m(n) - m(n-1)]$$

where m(n) is the TP index for the n-th PCR TP. $\Delta t_d$ is represented in 45 kHz ticks per MPEG packet.

The first packet's delivery time is determined as $$t_d(0) = t_a(0) + D$$

This applies also to the packet after PCR discontinuity. The system delay D here is selected so that it would correspond to a channel buffer of half full. In a embodiment, the channel buffer is 300 ms, so D is 150 ms.

For subsequence packets, delivery time is calculated depending whether it carries PCR or not. For PCR packets, $$t_d(n) = t_d(n-1) + \Delta t_s(n) + f_d(n-1) \times \Delta t_s(n)$$

For non-PCR packets (and slave PCR packets), $$t_d(m) = t_d(m-1) + \Delta t_d$$

In the above calculations, the packet interval, $\Delta t_d$ is required. For CBR transport stream, $\Delta t_d$ is a constant, hence the delivery time of any non-PCR packet can be computed very quickly using extrapolation, for example.

PCR Adjustment

According to the MPEG-2 standard, the PCR fields in a bit stream should reflect the send time of a TP. If the timing of the TP is altered due to multiplexing, the PCR fields need to be modified to reflect the adjusted timing. In the line card of the present invention, the PCR value is corrected by the output FPGA. Software prepares an output command for each output TP. The output command contains a flag to tell whether the TP contains a PCR. It also contains the offset $t_\Delta'$ between the local time base and the source time base. Output FPGA calculates the new PCR value by adding this offset to the local clock value at the TP's output time $t_d'$:

$$t_s'(n) = t_d'(n) + t_\Delta'(n)$$

This new PCR value is then stamped on the TP's PCR field. The time base offset is time-varying. $t_\Delta'(n)$ is only computed for the target delivery time $t_d(n)$. The actual delivery time $t_d'(n)$ is different from its target due to packet alignment or scheduling conflict. There will be some drift in the offset value between the target and the actual delivery time. However, it is assumed that the change in delivery time is small, so that the drift is negligible. If this assumption is invalid, then a more accurate computation of time base offset is required to take into account of the drift.

For SPTS streams, a time base offset $t_\Delta'$ will be provided by the clock recovery module to the output FPGA. This offset is computed in the source clock tracking section described above.

For MPTS streams, the slave PCR TP will be treated as a non-PCR packet for delivery time calculation as described above. For PCR adjustment, the time base offset (tbo) is calculated based on the input PCR and the delivery time as:

$$t_\Delta' = t_s - t_d$$

Output Timebase Change Handling

In some instances, the output time base needs to be changed, either when the clock recovery module transitions to steady state, or as an error handling method. The PCRs in the new time base are discontinued from those in the old time base. The following operations are performed:

$$t_d = t_a' + D$$

$$t_\Delta' t_\Delta = t_s - t_a'$$

$$e = 0$$

Basically, the channel buffer is reset to be half full, and the state in the phase lock loop is cleared. The discontinuity_indicator field in the header of the first TP in the new time base is set. This indicator signals to the MPEG-2 decoder (set top box) that the output time base has been changed, so the decoder can perform appropriate time base resynchronization. The visual artifact caused is usually minimal. This discontinuity signal is important because it resets the decoder's internal phase lock loop to avoid any subsequent visual artifact.

Clock Recovery State Transition

Figure 6:
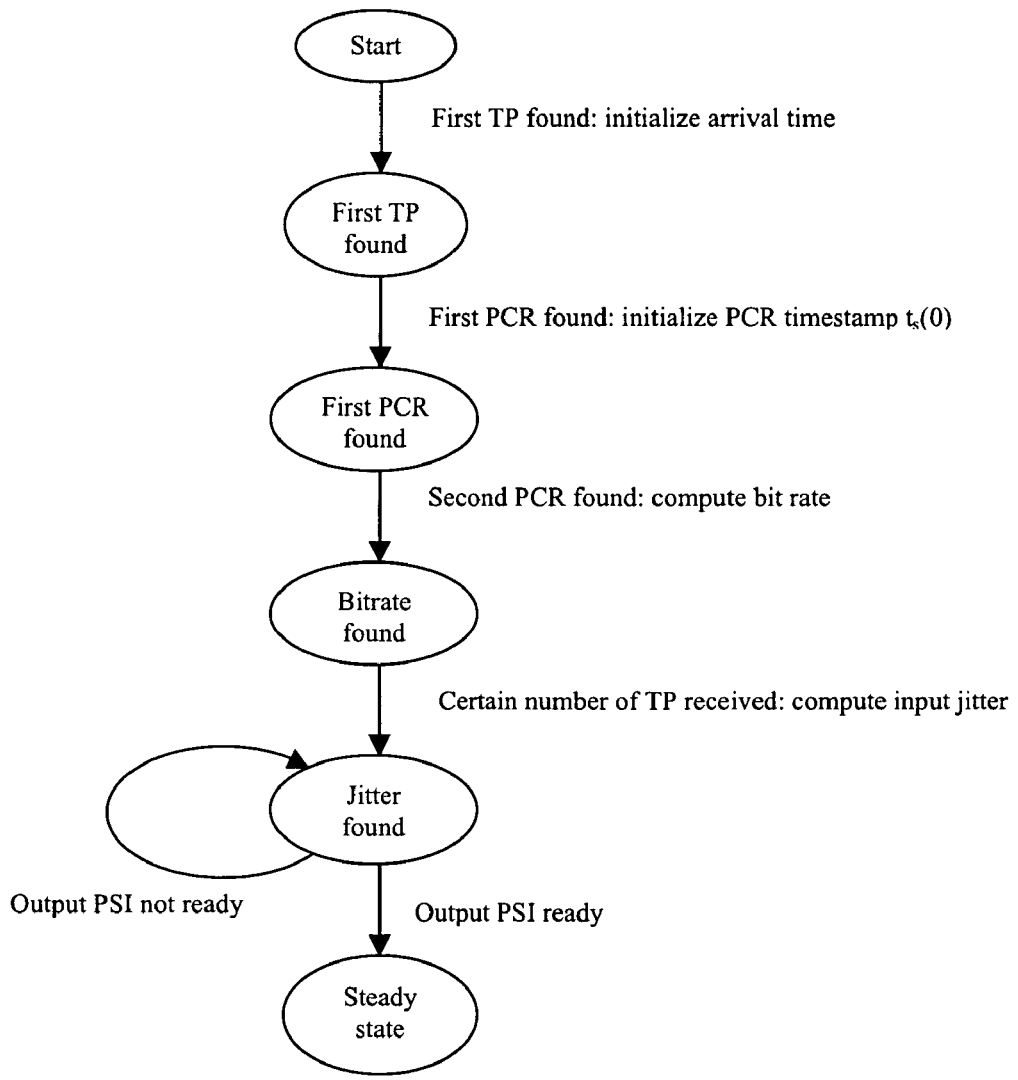
FIG. 6 shows the state diagram of the clock recovery module in accordance with an embodiment of the present invention.

FIG. 6 illustrates a state diagram of the clock recovery module in accordance with an embodiment of the present invention.

Start: A session is in this state if it is configured, but no TP has been received yet.

First TP found: A session transitions to this state upon the first TP received. The arrival time is recorded. The delivery time of this first TP is computed as:

$$t_d(0) = t_a(0) + D$$

This sets the channel buffer to be half full.

Since a bit rate is not known at this point, the output TP interval $\Delta t_d$ is set to a default value. For other TPs in this state, the delivery time is updated as:

$$t_d(n) = t_d(n-1) + \Delta t_d$$

First PCR found: A session transitions to this state upon the first PCR received. At this point, the time base offset can be estimated, but it may be contaminated by the arrival time jitter.

The PCR value is recorded. The initial time base offset is computed as:

$$t_\Delta'(0) = t_\Delta(0) = t_s(0) - t_a'(0)$$

Bit rate found: A session transitions to this state on the second PCR received. As this point, the two received PCRs can be used to roughly determine the bit rate.

The bit rate is calculated using the received pair of PCR values and their TP index as follows:

$$R = (t_s(n_1) - t_s(n_0)) / (n_1 - n_0)$$

Jitter found: After a fixed number of TPs (currently set to 2500 TPs) have been received for a session, input jitter is computed. The jitter measurement is used to position an operating point in the channel buffer appropriately. For each TP, jitter is calculated as $$j = t_a - t_a'$$

The maximum and minimum jitter over a dejittering period is maintained, and their difference at the end of the period is considered the jitter value (peak to peak).

Steady state: After input jitter is found, and output PSI is ready, the clock recovery module waits for the next PCR TP, and then performs the following acts:

adjust the dejittered arrival time $t_a'$ to the mid-point of the measured jitter range adjust output time base and signal discontinuity to decoder Control then transitions to the steady state, under which clock recovery is fully functioning, and the output timing is MPEG-2 compliant. It is important to perform time base adjustment after the output PSI is ready. Otherwise the decoder may miss the discontinuity indicator.

Trick Mode Handling

Trick mode is a way of providing VCR type functionalities like fast forward or rewind for an MPEG bit stream. The common way video servers support trick mode is to derive fast forward or rewind tracks from the normal play track. The video server will play the appropriate track according to user's control. Note that the trick mode tracks are encoded with correct PCR clock rate (27 MHz). So from clock recovery point of view, no special handling is required for the trick mode tracks. The only problem is when a user switches from one track to another, a PCR jump occurs, and there is probably a change in PSI. To overcome these problems, embodiments of the present invention incorporate error handling procedures to handle signal discontinuity and PCR discontinuity, which are described below.

Input Time Base Discontinuity Detection and Handling

Signal discontinuity describes an interruption in the reception of incoming IP packets by more than when network jitter would normally be introduced. PCR discontinuity indicates the PCR has a big jump, either forward or backward, when compared to the previous PCR value. This will mostly happen when the source has a time base change, when there is an edit in the source bit stream, or during transition between normal play and trick modes. Embodiments of the present invention detect PCR discontinuity by comparing PCR values of the incoming IP packets. The clock recovery module re-synchronizes to the new clock phase and performs the output time base change handling as described above.

Internal Buffer Underflow and Overflow Handling

Buffer underflow or overflow can be detected by comparing the estimated delivery time with the arrival time of a packet. Buffer error is normally caused by a video server with a noncompliant clock rate (more than 30 ppm apart from 27 MHz), or excessive network jitter).

In an embodiment, the present invention checks for buffer error only on TPs with PCR. In an embodiment, the present invention checks for buffer underflow when a TP's delivery time is lower than a certain threshold. In this case, the TP's delivery time will be adjusted to the initial buffer stay time, and there will be a gap in the output packet schedule.

In an embodiment, the present invention triggers buffer overflow when a TP's delivery time is larger than a certain threshold. In this case, the TPs will be bursted out at a set maximum rate until the delivery time will be according to the initial buffer stay time. No output TPs are dropped in the process.

In both cases, the present invention resets dejittered arrival time to be mid-point of the measured jitter range, and perform output time base adjustment. This operation is similar when clock recover transitions into the steady state.

While a method and apparatus for implementing clock recovery for remultiplexed MPEG-2 SPTSs and/or MPTSs in the presence of network jitter has been described and illustrated in detail, numerous modifications can be made to various embodiments of the present invention without departing from the spirit thereof.

What is claimed is:

1. In an MPEG-2 compliant network over which a stream of packets is delivered over UDP/IP, a method for performing clock recovery comprising:
   applying a dejittering filter to incoming packets in the stream to form dejittered packets with reduced IP packetization;
   adjusting program clock references in the dejittered packets by applying a phase lock loop to the dejittered packets that have program clock references,
   where applying the phase lock loop to the dejittered packets comprises using an infinite impulse response low pass filter to produce a time-averaged time base error, and converting the time-averaged time base error into a clock frequency difference by a loop gain multiplier, and
   where the frequency difference is clamped to maintain a clock slew rate in compliance with an MPEG-2 System specification;
   performing delivery time calculations on the incoming packets; and
   assembling the dejittered packets into an MPEG-2 compliant output stream.

2. The method of claim 1, where the stream of packets comprises a single program transport stream, and where the phase lock loop converges within one second of receiving input on the stream of packets.

3. The method of claim 1, comprising calculating an estimated time base offset for a subsequent program clock reference, the estimated time base offset used to perform correction of the program clock reference.

4. The method of claim 3, comprising computing a time base offset between the program clock reference and a dejittered time arrival.

5. The method of claim 4, comprising determining a source clock rate by comparing the calculated time base offset with the estimated time base offset.

6. The method of claim 1, where the frequency difference is clamped to maintain an output clock frequency in compliance with an MPEG-2 System specification.

7. The method of claim 1, where an output packet interval is adjusted on each packet containing a program clock reference.

8. The method of claim 1, comprising detecting a discontinuity in the program clock references, and resynchronizing to a new clock phase in response to detecting the detected discontinuity.

9. The method of claim 1, comprising changing an output time base on packets on the output stream by:
   resetting a channel buffer to be half full;
   clearing state information in the phase lock loop; and
   setting a discontinuity indicator in a first packet in the output stream to indicate a new time base.

10. The method of claim 1, comprising:
    for a packet containing a program clock reference, adjusting a delivery time for the packet to an initial buffer stay time.

11. The method of claim 1, comprising:
    for a packet containing a program clock reference and having a delivery time greater than a predetermined threshold, transmitting the output stream in bursts until delivery time is substantially equivalent to initial buffer stay time.

12. An apparatus, comprising:
    an input module to receive an incoming MPEG-2 packet from a UDP/IP network;
    a dejitter filter to remove arrival time jitter and IP packetization from the incoming MPEG-2 packet, where removing arrival time jitter includes applying an Infinite Impulse Response (IIR) filter to the incoming MPEG-2 packet to produce a dejittered packet and a dejittered arrival time;
    a clock recovery module to recover a Program Clock Reference (PCR) clock rate from the dejittered packet, where recovering the PCR clock rate includes applying a phase lock loop to the dejittered packet to produce a corrected packet having a corrected PCR, and
    where the clock recovery module resynchronizes to a new clock phase in response to detecting a discontinuity in the PCRs, and sets a discontinuity indicator in a first packet in an MPEG-2 output stream to indicate a new time base; and
    a mux module to assemble a set of corrected packets into an MPEG-2 output stream, where the MPEG-2 output stream is provided on a Hybrid Fiber-Coaxial (HFC) network.

13. The apparatus of claim 12,
    where the dejitter filter is configured to apply the IIR filter to a null packet; and where recovering the PCR clock rate includes recovering the PCR clock rate on dejittered packets that contain a PCR, where the recovering is based, at least in part, on the dejittered arrival time.

14. The apparatus of claim 13, where recovering the PCR clock rate comprises:
    calculating a time base offset between the dejittered arrival time and the PCR of the dejittered packet, and
    comparing the time base offset with an estimated time base offset to produce an estimation error.

15. The apparatus of claim 14, where recovering the PCR clock rate comprises:
    normalizing the estimation error to produce a normalized error, and
    providing the normalized error to an IIR filter, to produce a filtered error.

16. The apparatus of claim 15, where recovering the PCR clock rate comprises:
    providing the filtered error to a loop gain multiplier to produce an estimated frequency difference.

17. The apparatus of claim 16, where recovering the PCR clock rate comprises:
    clamping the estimated frequency difference to produce an MPEG-2 compliant estimated frequency difference.

18. In an MPEG-2 compliant network over which a stream of packets is delivered over UDP/IP, a method for performing clock recovery comprising:
    applying a dejittering filter to incoming packets in the stream to form dejittered packets with reduced IP packetization;

adjusting program clock references by applying a phase lock loop to the dejittered packets that have program clock references, where the phase lock loop converges within one second of receiving input on the stream of packets, where applying the phase lock loop to the dejittered packets comprises using an infinite impulse response low pass filter to produce a time-averaged time base error, and converting the time-averaged time base error into a clock frequency difference by a loop gain multiplier, and where the frequency difference is clamped to maintain a clock slew rate and an output clock frequency in compliance with an MPEG-2 System specification;

performing delivery time calculations on the incoming packets; and assembling the packets into an MPEG-2 compliant output stream based, at least in part, on the delivery time calculations and the program clock references.

19. The method of claim 18, further comprising:

calculating an estimated time base offset for a subsequent program clock reference;

correcting the program clock reference using the estimated time base offset; and resynchronizing to a new clock phase in response to detecting a discontinuity in the program clock references.

* * * * *